United States Patent [19]
Lentz et al.

[11] Patent Number: 5,446,836
[45] Date of Patent: Aug. 29, 1995

[54] POLYGON RASTERIZATION

[75] Inventors: Derek J. Lentz, Los Gatos; David R. Kosmal, Newark; Glenn C. Poole, Fremont, all of Calif.

[73] Assignee: Seiko Epson Corporation, Tokyo, Japan

[21] Appl. No.: 968,901

[22] Filed: Oct. 30, 1992

[51] Int. Cl.$^6$ ............................................. G06F 15/72
[52] U.S. Cl. ................................................... 395/141
[58] Field of Search ............... 395/140, 141, 142, 143, 395/128, 129; 345/147, 149, 118; 382/46, 54

[56] References Cited

U.S. PATENT DOCUMENTS

4,962,468 10/1990 Beauregard et al. ................ 364/521
5,187,658 2/1993 Cline et al. ....................... 364/413.13

FOREIGN PATENT DOCUMENTS

0425189 2/1991 European Pat. Off. .

OTHER PUBLICATIONS

Juan Pineda, "A Parallel Algorithm for Polygon Rasterization, " *Computer Graphics*, vol. 22, No. 4, pp. 17–20, Aug. 1988.

*Primary Examiner*—Phu K. Nguyen
*Attorney, Agent, or Firm*—Sterne, Kessler, Goldstein & Fox

[57] ABSTRACT

System and method for the rasterization of polygons. Each edge of the polygon (e.g., a triangle) is represented by a linear edge function which classifies each pixel within the plane of the polygon. In particular, pixels having a value greater than zero are on one side of an edge and less than zero on the opposite side of an edge. Each pixel within the plane of the polygon has associated with it a set of edge variables which represent the signed, horizontal distance between the pixel and the respective edges of the polygon. A pixel is rendered based on the value of a pixels edge variables which is generated with reference to the edge functions. The edge functions are applied to a linear span of pixels. Initially, the value of a set of edge variables for a given pixel within a triangle is determined by evaluating the three edge functions associated with that triangle. In order to determine which pixels to render, the present invention generates a W-bit render mask based upon the values of these edge variables. These values are applied to the span of pixels without the need to perform additional calculations for the remainder of the pixels within the span.

20 Claims, 8 Drawing Sheets

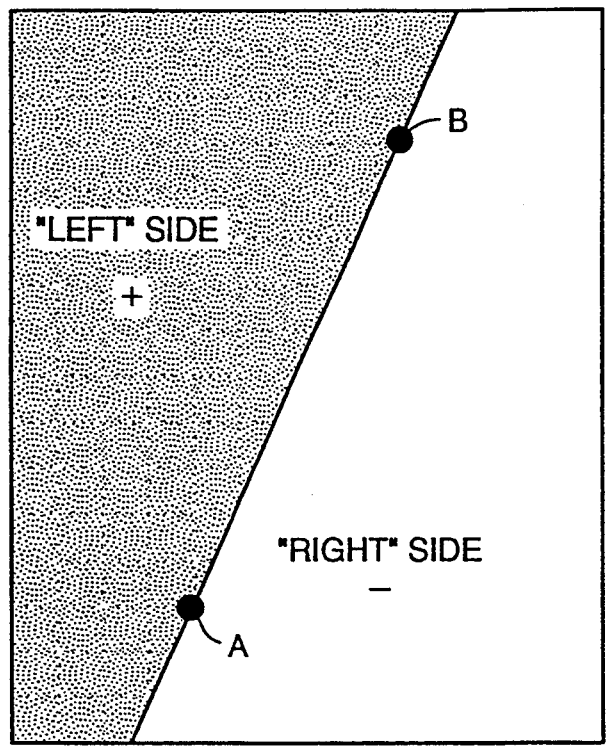
FIG._1
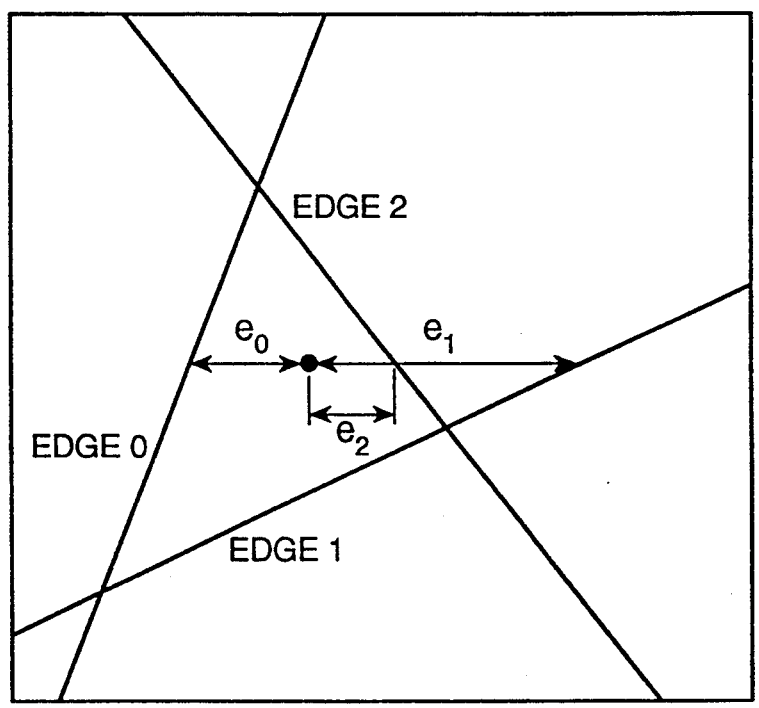
FIG._2

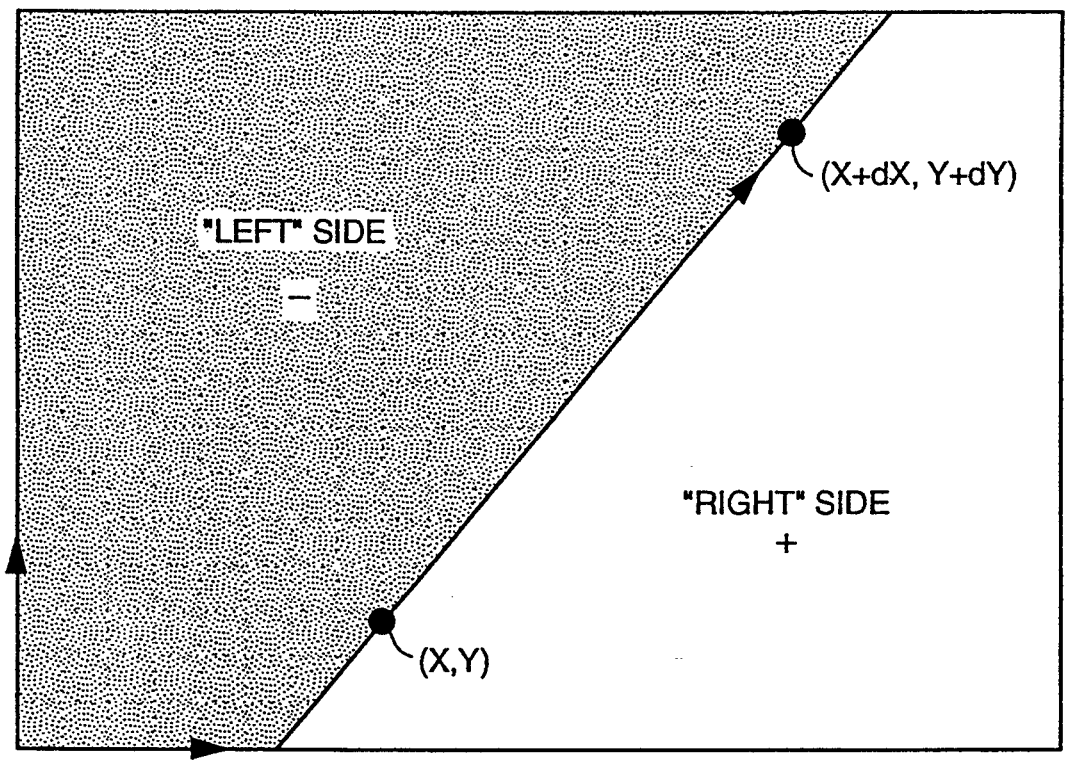
FIG._3
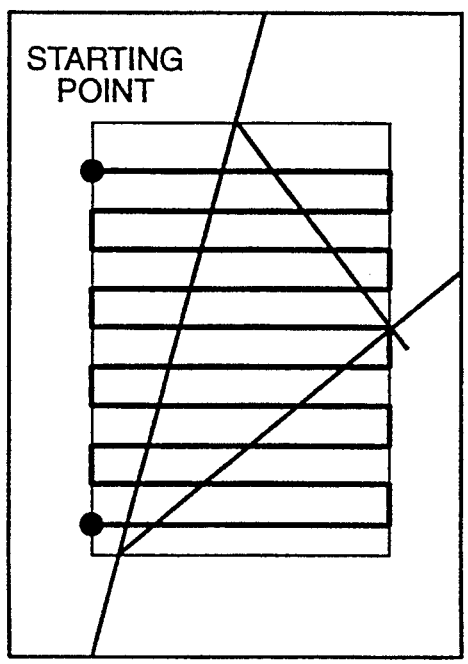
FIG._4A
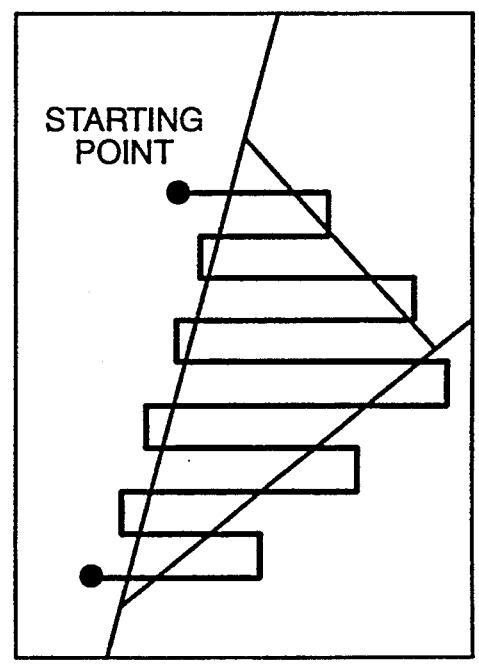
FIG._4B

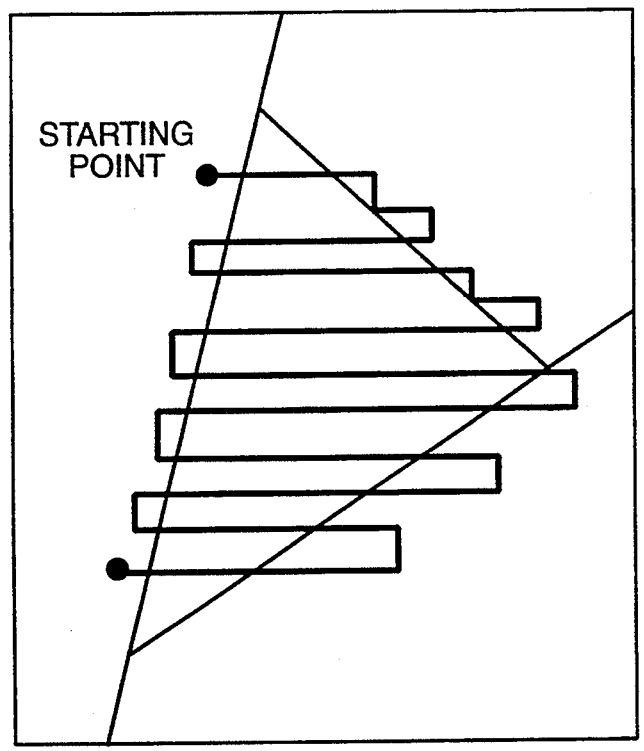
FIG._5
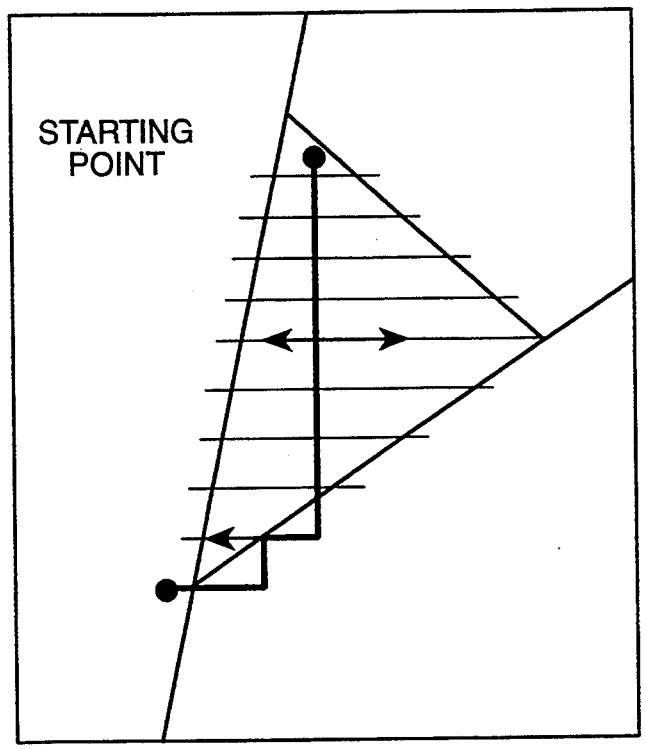
FIG._6

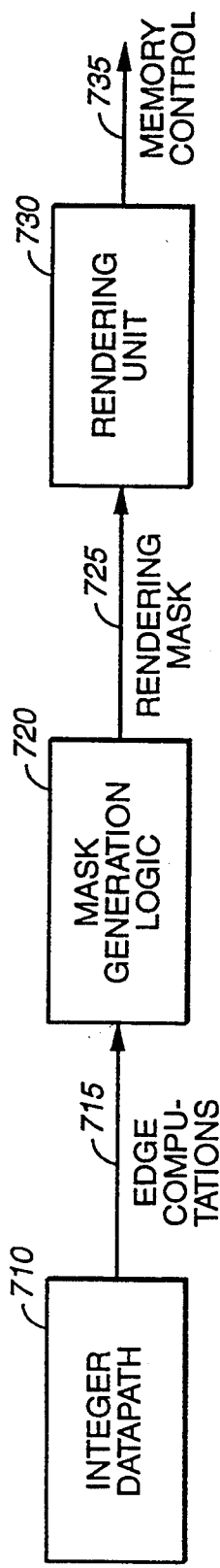
FIG._7
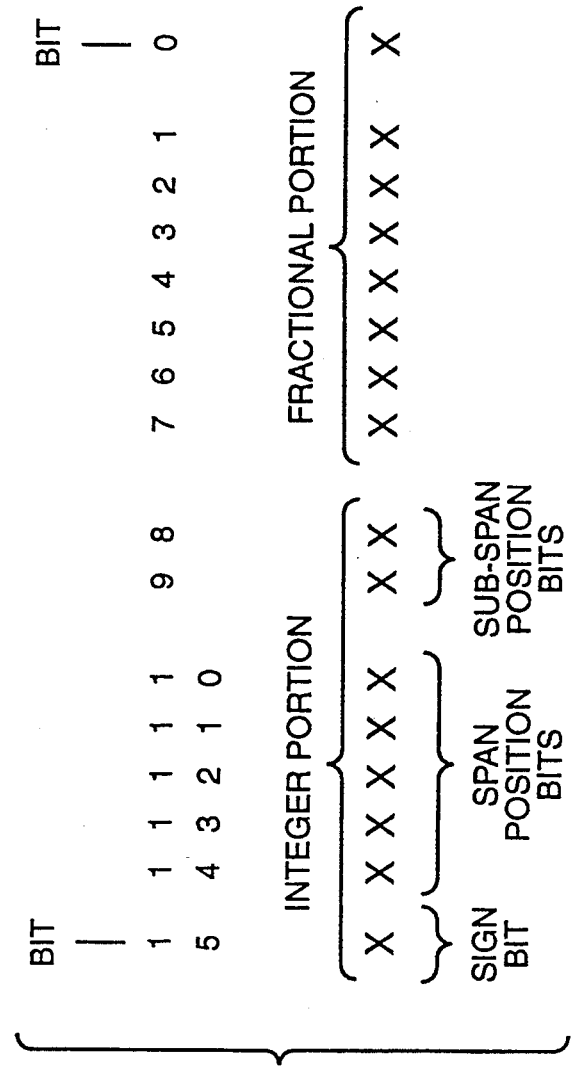
FIG._8

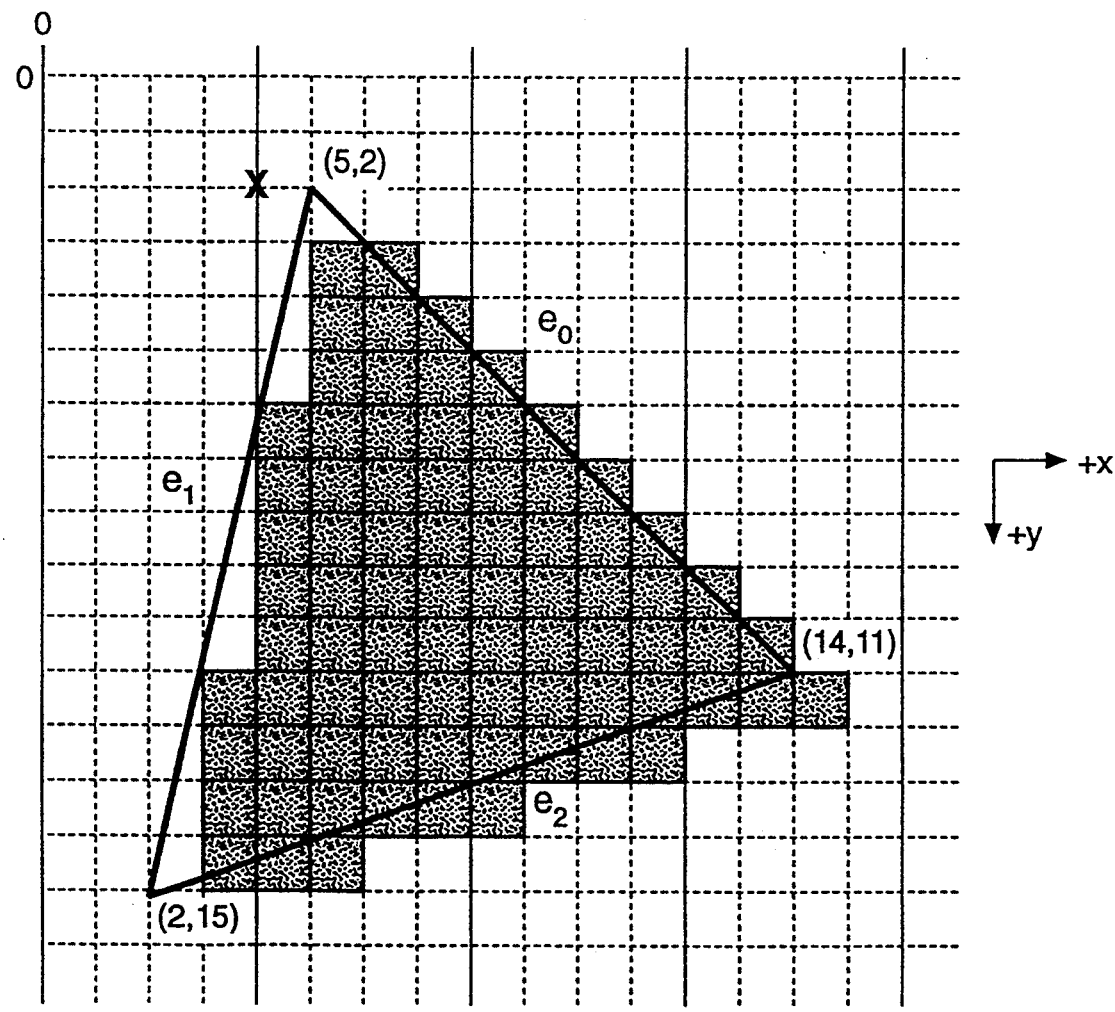
FIG._9

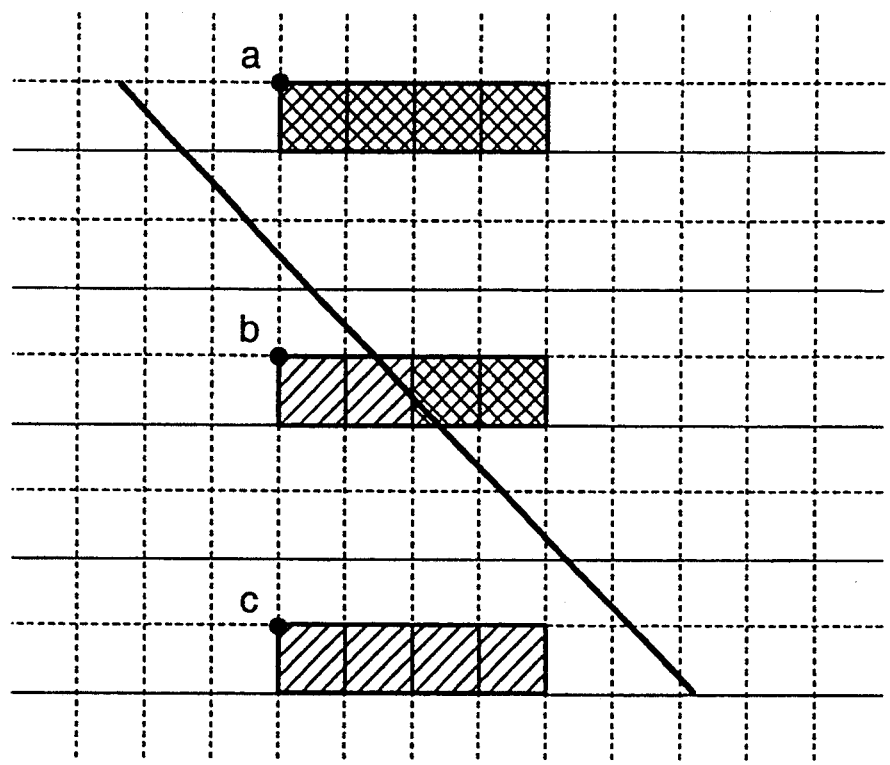
FIG._10
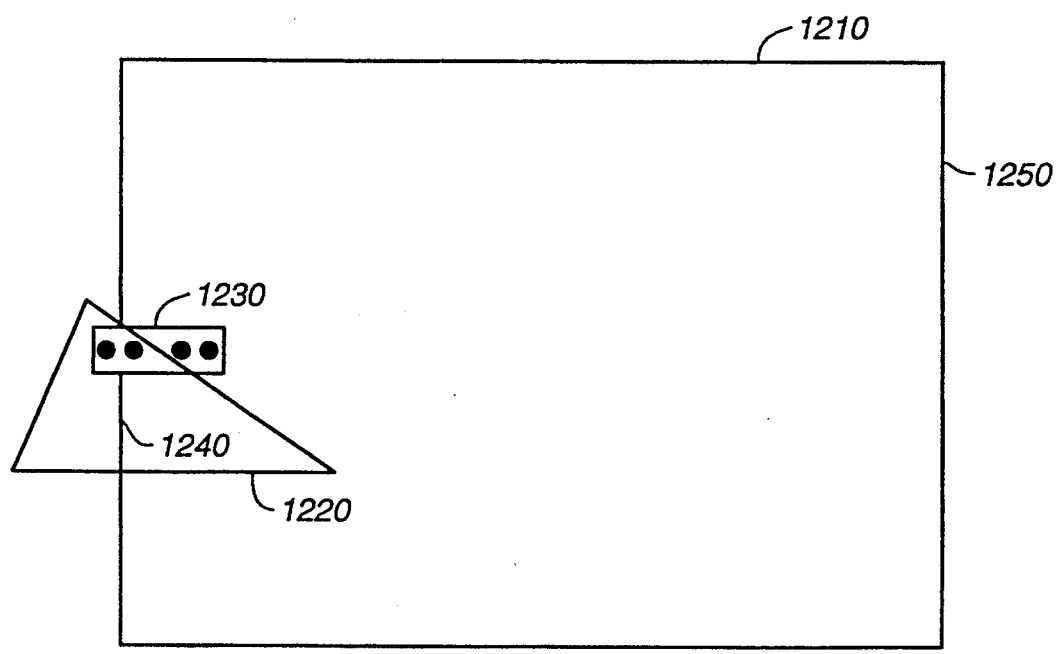
FIG._12

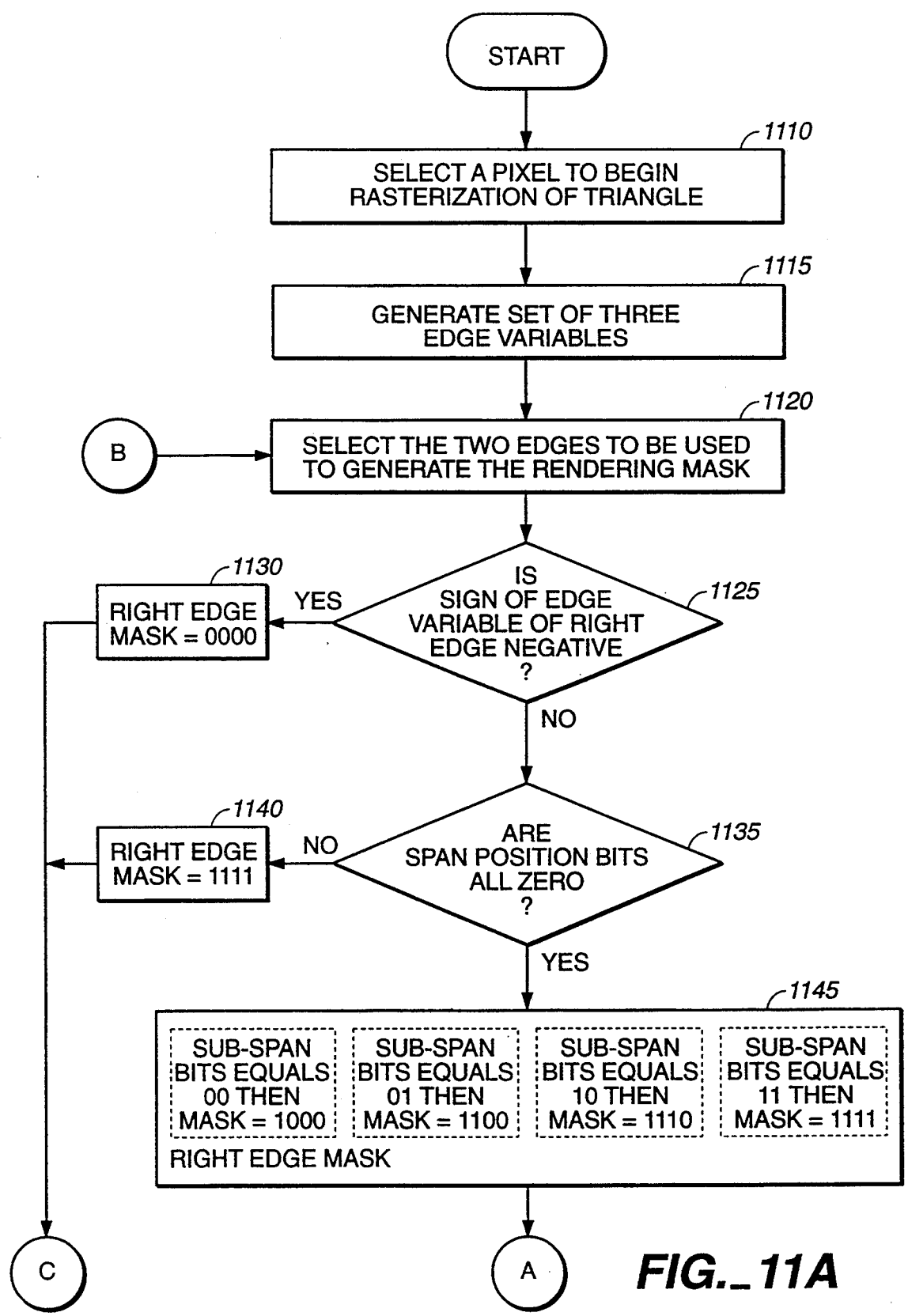
*FIG._11A*

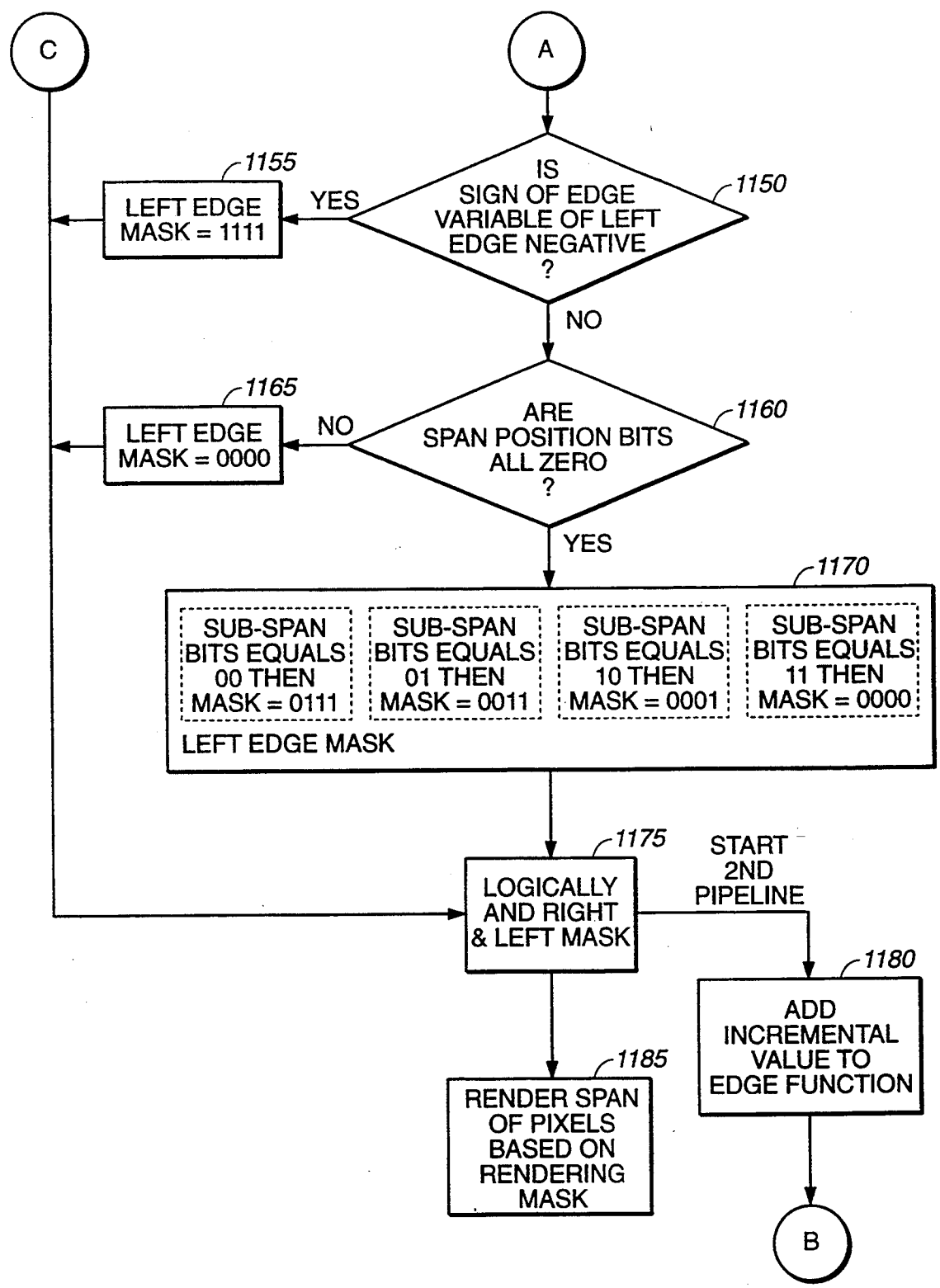
FIG._11B

POLYGON RASTERIZATION

BACKGROUND OF THE INVENTION

1. Field of Use

The present invention relates generally to computer graphics, and more specifically, to a system and method for determining which pixels to render as part of a triangle in order to rasterize polygons.

2. Related Art

Raster displays are commonly used in computer graphics systems. These displays store graphics images as a matrix of picture elements or "pixels" (also referred to as PELs) with data representing each pixel being stored in a display buffer. This data specifies the display attributes for each pixel on the screen such as the intensity and color of the pixel. An entire image is read from the display buffer and painted on the screen by sequentially scanning out horizontal rows of pixel data or "scan lines," and using this data to control one or more electron beams (of course other display technologies can be used such as LCDs). This process of scanning pixel data out of the display buffer row-by-row is repeated every refresh cycle.

Raster display systems commonly use polygons as basic building blocks or "primitives" for drawing more complex images. Triangles are a common basic primitive for polygon drawing systems, since a triangle is the simplest polygon and more complex polygons can always be represented as sets of triangles. The process of drawing triangles and other geometric primitives on the screen is known as "rasterization." The rasterization of polygons is a problem fundamental to both two-dimensional and three-dimensional graphics systems. Most techniques that apply to the rasterization of triangles can be generalized for a polygon with any number of sides.

An important part of rasterization involves determining which pixels fall within a given triangle. Rasterization systems generally step from pixel to pixel and determine whether or not to "render" (i.e., draw into a frame buffer or pixel.nap) each pixel as part of the triangle. This, in turn, determines how to set the data in the display buffer representing each pixel. Various traversal algorithms have been developed for moving from pixel to pixel in a way such that all pixels within the triangle are covered.

Rasterization systems sometimes represent a triangle as a set of three edge-functions. An edge function is a linear equation representing a straight line, which serves to subdivide a two-dimensional plane. Edge functions classify each point within the plane as falling into one of three regions: the region to the "left" of the line, the region to the "right" of the line, or the region representing the line itself. The type of edge function which will be discussed has the property that points to the "left" of the line have a value greater than zero, points to the "right" have a value less than zero, and points exactly on the line have a value of zero (this can be seen in FIG. 1). Applied to rasterization systems, the two-dimensional plane is represented by the graphics screen, points are represented by individual pixels, and the edge function serves to subdivide the graphics screen.

Triangles are created by the union of three edges, each of which are specified by edge functions. It is possible to define more complex polygons by using Boolean combinations of more than three edges. Since the rasterization of triangles involves determining which pixels to render, a tie-breaker rule is generally applied to pixels that lie exactly on any of the edges to determine whether the pixels are to be considered interior or exterior to the triangle.

Each pixel has associated with it a set of edge variables, ($e_0$, $e_1$, $e_2$), which represent the signed distance between the pixel and the three respective edges, as shown in FIG. 2. The value of each edge variable is determined for a given triangle by evaluating the three edge functions, $f_0(x,y), f_1(x,y)$ and $f_2(x,y)$ for the pixel location. Edge variables can have fractional values, since an edge may fall between two adjacent pixels. It is convenient, therefore, to represent edge variables in fixed point 2's complement integer format. Note that it can be determined whether or not a pixel falls within a triangle by looking at the signs of $e_0$, $e_1$ and $e_2$, if it is known whether each edge is a "right" edge or a "left" edge of the triangle. Note that the signs of the edges can be reversed if desired.

In determining which pixels to render within a triangle, typical rasterization systems compute the values of the edge variables, ($e_0$, $e_1$, $e_2$), for a given set of three edge functions and a given pixel position, and then use a set of increment values ($\Delta e_{left}, \Delta e_{right}$, etc.) to determine the edge variable values for adjacent pixels. The rasterization system traverses the triangle, adding the increment values to the current values as a traversal algorithm steps from pixel to pixel. A pixel that is within the triangle bounds according to the pixel's three edge variable values (and any tie-breaker rules) will be rendered.

Systems having simple hardware generally perform these computations separately for each pixel while more complex systems having more arithmetic units may compute the values for multiple pixels simultaneously. Although parallel evaluation of the edge variables for multiple pixels results in faster rasterization, the process remains limited by the need to separately determine the edge variables for every traversed pixel.

An examination of an edge function which can be used to rasterize triangles, and of various algorithms for traversing the triangle, will provide a better understanding of the process described above. A detailed description of the use of edge functions and traversal algorithms can be found in "A Parallel Algorithm for Polygon Rasterization," Pineda, J., Computer Graphics 22(4): 17–20 (1988), which is incorporated by reference herein. Portions of the Pineda reference have been substantially reproduced below for the convenience of the reader.

Consider, as shown in FIG. 3, a vector defined by two points: (X,Y) and (X+dX,Y+dY), and the line that passes through both points. As noted above, this vector and line can be used to divide the two dimensional space into three regions: all points to the "left" of, to the "right" of, and exactly on the line.

The edge f(x,y) can be defined as:

$$f(x,y) = (x-X)dY - (y-Y)dX$$

This function has the useful property that its value is related to the position of the point (x,y) relative to the edge defined by the points (X,Y) and (X+dX, Y+dY):

$f(x,y) > 0$ if $(x,y)$ is to the "right" side $f(x,y) = 0$ if $(x,y)$ is exactly on the line $f(x,y) < 0$ if $(x,y)$ is to the "left" side To convince oneself that this is true, those skilled in the art will recognize that the formula given for f(x,y) is the same as the formula for the magnitude of the cross product between the vector from (X,Y) to (X+dX, Y+dY), and the vector from (X,Y) to (x,y). By the well known property of cross products, the magnitude is zero if the vectors are collinear, and changes sign as the vectors cross from one side to the other.

This function is commonly used by existing rasterization systems, since it can be computed incrementally by simple addition:

$$f(x+1,y) = f(x,y) + dY$$

$$f(x,y+1) = f(x,y) + dX$$

The edge function is related to the error value or "draw control variable" (DCV) in Bresenham line drawing algorithms described in "Algorithm for Computer Control of a Digital Plotter," Bresenham, J., IBM Systems Journal 4(1):25-30 (1965). The difference is that Bresenham line drawing algorithms maintain the DCV value only for pixels within ½ pixel of the line, while f(x,y) is defined for all pixels on the plane. In addition, the value of the DCV at a given point differs from f(x,y) by a constant offset. In any case, the reason that both algorithms work is fundamentally the same.

This same property of f(x,y) is used by the graphics system described in "PIXEL-PLANES" graphics system, described in Fuchs, et al., VLSI Design (3rd Quarter):20-28 (1981), where this function is computed in parallel for all pixels in the frame buffer by a multiplier tree.

A variety of different traversal algorithms are presently used by different rasterization systems in the rendering process. Any algorithm guaranteed to cover all of the pixels within the triangle can be used. FIG. 4 shows two simple implementations of traversal algorithms. Traversing the bounding box is perhaps the simplest strategy, as shown in FIG. 4(a), but generally not the most efficient. A smarter algorithm, shown in FIG. 4(b), would advance to the next traversal line when it "walks" off the edge of a triangle.

One complication of the smarter algorithm is that when it advances to the next line, it may advance to a point inside the triangle. In that case, the algorithm must search for the outside of the edge before it begins the next scan line. An example of this problem is shown on the top right hand edge of the triangle in FIG. 5.

An implementation of an even smarter algorithm is shown in FIG. 6. It proceeds down from the starting point, working its way outward from a center line. The advantage of this algorithm over the simpler algorithm is that it never has to search for an edge, then double back. The tradeoff is that the interpolator state for the center line must be saved while traversing the outer points, since the interpolators must be restarted back at the center line. Notice that at the bottom, the "center" line shifts over if it ends up exterior to the triangle.

There are a number of different ways to traverse the pixels in the triangle. The efficiency of each method depends upon the particular triangle being rendered. Many systems organize pixels in the memory in rectangular blocks. Some of these systems then cache these blocks in a fast memory, similar to the way a CPU caches data and instructions. When used in conjunction with an appropriate traversal algorithm, this organization can improve performance by keeping memory accesses to a minimum.

Regardless of the amount of hardware available or the method of traversing the pixels within the triangle, at least three addition operations must be performed per pixel when using the pixel-by-pixel method described above. These three additions correspond to the three increment values which must be added to the values of the edge variables, $e_0$, $e_1$ and $e_2$, to determine the respective values for an adjacent pixel, as discussed above. Thus, under present rasterization techniques, efficiency is limited by the number of calculations per pixel required to determine whether or not the pixel falls within the triangle. This limited efficiency translates into slower graphics display systems. A method for rendering triangles which reduces the number of calculations required per pixel is therefore required.

SUMMARY OF THE INVENTION

The present invention provides a system and method for the rasterization of polygons. Each edge of the polygon (e.g., a triangle) is represented by a linear edge function which classifies each pixel within the plane of the polygon. In particular, pixels having a value greater than zero are on one side of an edge and less than zero on the opposite side of an edge. Each pixel within the plane of the polygon has associated with it a set of edge variables which represent the signed, horizontal distance between the pixel and the respective edges of the polygon. A pixel is rendered based on the value of its edge variables which are generated with reference to the edge functions.

The present invention allows the edge functions to be applied to a linear span of pixels. Initially, the value of a set of edge variables for a given pixel within a triangle is determined by evaluating the three edge functions associated with that triangle. In order to determine which pixels to render, the present invention generates a W-bit render mask based upon the values of these edge variables. The present invention allows these values to be applied to the span of pixels without the need to perform additional calculations for the remainder of the pixels within the span.

BRIEF DESCRIPTION OF THE DRAWINGS

The above and further advantages of this invention may be better understood by referring to the following description taken in conjunction with the accompanying drawings, in which:

FIG. 1 illustrates the division of each point within a plane as falling into one of three regions.

FIG. 2 illustrates the association of a set of edge variables with a particular pixel.

FIG. 3 graphically illustrates a vector and line which represents an edge function which can be used to divide two dimensional space into three regions.

FIG. 4(a) and FIG. 4(b) show two simple algorithms for traversing the pixels within a given triangle.

FIG. 5 illustrates a solution to the problem shown in FIG. 4(b).

FIG. 6 illustrates a sophisticated algorithm (relative to that shown in FIG. 4) for traversing the pixels within a given triangle.

FIG. 7 is a block diagram of the scanning hardware used by the present invention.

FIG. 8 illustrates an edge variable broken into three fields of bits.

FIG. 9 illustrates an example of a triangle to be rendered.

FIG. 10 illustrates an example of a mask generation for a left edge.

FIG. 11a and FIG. 11b show a flowchart of the polygon rasterization method.

FIG. 12 illustrates an example of a triangle that falls outside of a window.

In the drawings, like reference numbers indicate identical or functionally similar elements. Additionally, the left-most digit of the reference number identifies the drawing in which the reference number first appears.

DETAILED DESCRIPTION OF THE PRESENT INVENTION

The present invention provides a system and method for the rasterization of polygons. The present invention requires less calculations to render pixels within a polygon than the conventional pixel-by-pixel method. Each edge of a polygon (e.g., a triangle) is represented by a linear edge function that has a value greater than zero on one side of the edge and less than zero on the opposite side of the edge. The present invention allows edge functions to be applied to a linear span of pixels while only requiring the edge function addition operations to be performed for one of the pixels within the span.

The initial computation values used for rasterization under the present invention (i.e., rasterization using a single linear span) are similar to those required for pixel-by-pixel rasterization. These are as follows:

The current scan position (i.e., a predetermined pixel) in the traversal algorithm is represented by coordinates (x, y).

A set of edge variables $e_0$, $e_1$, $e_2$, represented in fixed-point 2's complement integer format, corresponding to three respective edge functions $f_0$, $f_1$, $f_2$ (e.g. $e_0 = f_0(y) - x$). Each edge variable consists of an integer field (which includes a sign bit) and a fractional field.

A one-bit edge flag for each edge which specifies whether the edge is to be treated as a "right edge" or a "left edge" of the triangle. A set flag specifies a right edge, indicating that pixels falling to the right side of the edge, and thus having a corresponding edge variable value greater than zero, are not within the triangle. Pixels having a negative value for a right edge may fall within the triangle. A cleared flag indicates a left edge, and that only pixels with positive values may fall within the triangle. The flag, therefore, specifies how the values should be interpreted for a given edge. When an edge variable has a value of zero it is arbitrary whether it is considered inside the triangle or outside the triangle (provided that the decision is performed consistently).

It is possible to organize the edge variables so that only one flag is needed to interpret the edge variables. In this case, a set flag indicates that the triangle is right-oriented, meaning that $e_1$ is a left edge and $e_0$, $e_2$ are right edges. When the flag is not set, the triangle is left-oriented and the edges are reversed. All triangles fit into one of these two cases.

A set of "step-values" for each edge variable ($\Delta e_{left}$, $\Delta e_{right}$, etc.): The step-values are added to or subtracted from the values of the edge variables to determine the values at adjacent pixels. Each edge variable has an increment value for any direction that the traversal will scan. These are also fixed-point 2's complement integer values.

The present invention works with a span of pixels that are W pixels wide. W can be any power of 2. The dimensions of the span do not necessarily need to correspond to the blocks of data accessed by the memory system, although this will generally decrease memory bandwidth usage.

Referring to FIG. 7, the scanning hardware used by the present invention is divided into three parts: (1) a simple integer datapath 710; (2) a pixel mask generation unit 720; and (3) a rendering unit 730. Integer datapath 710 is a simple straightforward unit that contains registers for the computation values, one or more adder/subtracter units, and appropriate control logic. In particular, the integer datapath 710 contains hardware for generating the edge variables for each edge in the triangle being rendered. Pixel mask generation unit 720 determines which pixels within a span of w pixels are to be rendered by generating a pixel mask based upon the value of the edge variables provided by integer datapath 710. This unit generates a separate mask, referred to as a rendering mask, for each edge variable and produces the logical AND of the three masks as a final output (i.e. rendering mask 725). As will be described below, in a preferred embodiment only two masks are used to produce the rendering mask 725. Each bit in the rendering mask represents an individual pixel on the screen. Rendering unit 730 takes the rendering mask 725 from the mask generation unit 720 and issues commands 735 to the memory system for each pixel to be either rendered or not.

In order to determine which pixels to render, the system generates a W-bit render-mask 725 based upon the values of the edge variables for a single pixel (i.e., the first pixel in the span of pixels). Bits that are set in the render-mask indicate which pixels are to be rendered as part of the triangle. To determine the respective render-mask bit for a given pixel, three edge-mask bits are generated (as described in the Background section), each indicating whether the pixel falls on the triangle side of one of the three respective edges. The render-mask bit is then generated by logically ANDing the three edge-mask bits. The resulting render-mask bit will be "1" if the pixel is to be rendered as part of the triangle, and "0" if it is not. Each render-mask, which consists of a string of W bits, consists of the render-mask bit for the pixel at position (x, y), and the render-mask bits for the next W−1 pixels in the horizontal row. It should be noted that the present invention could readily be applied using vertical distances between the pixels and the edges of the triangle instead of horizontal distances.

For each edge variable, there are three bit fields of interest in edge-mask generation. The first field is the sign bit. The second field consists of the sub-span position bits which are the N least-significant bits of the integer portion of the edge variable bits, where $W = 2^N$. The third field consists of the span-position bits, which are the remaining bits in the integer part of the edge variable. FIG. 8 shows these fields for a span of 4 bits. The resulting edge variable is 16-bits having an integer portion of 8 bits and a fractional portion of 8 bits. Note that for $W = 4$, the size of the sub-span field is $N = 2$. The fractional portion is not used for mask generation. Rather it is used to maintain accuracy when incrementing the edge variables.

The three bit fields of the edge variable value are used to determine whether or not the corresponding pixel falls on the triangle side of the edge. Additionally, these same three fields are used to determine whether each of the other W−1 pixels of the horizontal span falls on the triangle side of the edge. Of course, the values of the edge variables are interpreted differently for left and right edges, but the general idea is the same for both. Tables 1 and 2 show the masks generated for left and right edges. A span size of four (w=4) is used in this example, although this table is easily generalized for any span size that has a power of 2. In the tables it is assumed that pixels on the triangle edge are inside the triangle for left edges and outside the triangle for right edges.

TABLE 1

Mask Generation for Left Edges

| Sign | Span Position Bits | Sub-span Position Bits | Mask |
|---|---|---|---|
| negative | don't care | don't care | 1111 |
| non-negative | all zeros | 00 | 0111 |
| non-negative | all zeros | 01 | 0011 |
| non-negative | all zeros | 10 | 0001 |
| non-negative | all zeros | 11 | 0000 |
| non-negative | not all zeros | don't care | 0000 |

TABLE 2

Mask Generation for Right Edges

| Sign | Span Position Bits | Sub-span Position Bits | Mask |
|---|---|---|---|
| negative | don't care | don't care | 0000 |
| non-negative | all zeros | 00 | 1000 |
| non-negative | all zeros | 01 | 1100 |
| non-negative | all zeros | 10 | 1110 |
| non-negative | all zeros | 11 | 1111 |
| non-negative | not all zeros | don't care | 1111 |

The generation of these tables is described with reference to FIG. 9 and FIG. 10. FIG. 9 shows an example of a pixel grid with a triangle to be rendered contained therein. The three vertices are the points (5, 2), (2, 15), and (14, These vertices form three edges, indicated in the diagram as $e_0$ $e_1$, and $e_2$. This particular example is a right oriented triangle, since two edges, $e_0$ and $e_2$, form the boundaries of the right side of the triangle and only one edge forms the boundary of the left side. A left oriented triangle has two left and one right edge. The pixel grid is divided into spans that are 4 pixels wide. However, once again, any span that is a power of 2 is acceptable for the pixel-span mechanism described later.

Tables 1 and 2 are based upon the definition of edge variables as the horizontal distance between a pixel and the edge. FIG. 10 shows different values of the edge variable for a left edge at various pixel positions. For a left edge, a negative value indicates that the current pixel and all pixels to the right are within the bounds of the edge (span a). The edge variable associated with span a equals −2.1 (binary 1 . . . 1110). The mask for all left edge variables with a negative value is 1111. In other words, this mask indicates that all the pixels in the span should be rendered.

If the left edge is non-negative, there are two cases to consider. The first is when the value of the edge variable is less than w (span b). In this case, the span bits will be all zeros and the sub-span bits are used to determine which bits in the mask are set. The sub-span bits can be equal to either 00, 01, 10, or 11. There are four possibilities since there are four pixels represented in the mask. Each possibility represents a different set of pixels which need to be rendered. In the example shown, the edge variable for b equals 1.4 (binary 0 . . . 0001). The sub-span position bits are 01, and thus the mask is 0011. In other words, this mask represents the fact that the two right most pixels in the mask should be rendered.

The second case of a non-negative value of an edge variable is when the value is greater than or equal to w (span c). Here the span position bits will be nonzero. The resulting mask should thus indicate that all the pixels represented in the mask should not be rendered since all the pixels in the span are to the left of the edge. In the example, the edge variable for span c equals 5.1 (binary 0 . . . 0101). Consequently, all the bits in the mask will be zero (i.e., 0000).

The mask generation table for right edges is determined in a similar fashion.

FIG. 11 illustrates a flowchart of the operation of the pixel-span technique. Given a triangle to be rendered, a starting pixel is selected, as shown in step 1110. Three edge variables are generated corresponding to the selected pixel, as shown in step 1115.

In order to determine whether a pixel should be rendered, only two of the three edges must be utilized. Namely, one right edge and one left edge. If, for example, the triangle under consideration has two right edges (i.e., a right oriented triangle), the edge that is used as the right boundary will depend upon the value of y. If y is above the vertex joining the two right edges, then the upper right edge is used. Otherwise the bottom right edge is used. As shown in step 1120, the two edges required to generate the rendering mask are selected.

Steps 1125 through 1170 represent the use of Tables 1 and 2. Note that these steps would be different depending on the size of the span used. As shown in step 1125, the sign of the edge variable for the right edge is checked. If it is negative (symbolizing that the span is outside the triangle) then the Mask is set to 0000, as shown in step 1130. Next, the span position bits are checked, as shown in step 1135. If the span position bits are non-zero (symbolizing that the span is inside the triangle) then the Mask is set to 1111, as shown in step 1140. Otherwise, the sub-span bits are checked, as shown in step 1145, and the appropriate mask is selected based on the value of these bits.

Steps 1150 through 1170 represent the generation of the mask for the left edge. The steps are analogous to those described above for the right edge.

The resulting mask that determines which pixels to render is simply the logical AND of the mask created for the two edges (i.e., right edge and left edge), as shown in step 1175. The rendering pixel mask is passed to the rendering unit 730 where the appropriate control signals are sent to the memory system for each pixel to be rendered, as shown in step 1185.

In parallel with step 1185, an incremental value is added to the edge variable and the procedure can begin at step 1120 for the next pixel, where the next pixel is the first pixel after the span which falls within the path of the particular traversal algorithm being used.

Traversing the triangle can be done in a number of ways similar to conventional rasterization techniques described above. When traversing in a horizontal direction the datapath must compute the edge values for the pixel at position (x±w, y). This can be done using the horizontal step values for a single pixel shifted left by n bits, where $w=2^n$. This does not require shifter hardware, but simply a multiplexer that selects either the shifted or unshifted value.

Occasionally, a triangle to be rendered has a horizontal edge. In these cases, the present invention uses the remaining two edges (and not the horizontal edge), along with the procedure outlined above, to determine which pixels within a span of pixels are to be rendered. In other words, since only two edges are used to determine whether a pixel should be rendered and there is only one right edge and one left edge, there is no need to check the value of y to determine whether it is above or below the vertex joining two right or left edges. In the case of a triangle with a horizontal edge, the vertex will be either at the first span (e.g., when the horizontal edge is the top edge of the triangle) or the last span (e.g., when the horizontal edge is the bottom edge of the triangle). Consequently, only the two remaining edges are required to generate the pixel masks.

The present invention offers several advantages over conventional triangle rasterization techniques. First, fewer computations per pixel are required. The number of arithmetic operations required for maintaining the edge variables during traversal is one set for every span of pixels. This is accomplished without using extra adder/subtracter hardware for each pixel. Second, the present invention has a pipelined operation. The integer datapath 710, the mask generation unit 720, and the rendering unit 730 can operate independently in a pipelined configuration. This allows parallel computation without extra hardware. Third, the present invention is consistent with efficient memory architectures. Rendering pixels in horizontal spans allows easy implementation of traversal algorithms that are compatible with block organized pixel memories.

Below is a description of two mechanisms for rasterization of triangles in graphics hardware systems. The first mechanism, referred to as the single-pixel mechanism, is a version of a conventionally used technique. It is described at this point in the document so that it may be clearly contrasted with the improved operation of the present invention, which is described immediately thereafter. The present invention is described second, and is referred to as the pixel-span method. The pixel-span technique can render triangles using fewer operations per pixel.

Single-Pixel Method

Triangle rendering utilizes a routine that traverses a superset of the pixels within the triangle and performs a test at each pixel to determine if it should be rendered. Methods for determining the order of traversal are not discussed here, but instead simple assumptions are made regarding the traversal algorithm as the example is described. The decision to render a pixel is usually based on the set of edge variables that are updated at each pixel. The edge variables will be denoted by $e_0$, $e_1$ and $e_2$. In this discussion, an edge variable is defined as the horizontal distance from the current pixel position in the scan and the line formed by the triangle edge. There are many variations on how the edge variables can be defined, but all are generally derivatives of this general concept.

If $f(y)$ is a function that returns the x position of an edge for a given y, then the value of the edge variable e, at pixel (x, y) is defined as $e = f(y) - x$. $f(y)$ is called the edge-function for the given edge, and is easily determined from the triangle coordinates using basic algebra.

In the example, the edge functions for the three edges are as follows:

$$f_0(y) = y + 3$$

$$f_1(y) = -0.231y + 5.46$$

$$f_2(y) = -3y + 47$$

Using our definition for the edge variables, the following interpretation of the values applies: If the edge variable is positive, the pixel (x, y) is to the left of the edge, if it is negative it is to the right of the edge, and if it is zero it is on the edge. In order to determine whether the pixel is within the bounds of the triangle, two of the edge variables are used; one defining the left boundary and one defining the right. A pixel is within the bounds of a triangle if the edge variable associated with the pixel is non-negative. When the edge variable is zero for a given pixel, it is arbitrary whether or not it is considered within the boundaries on the edge. It is useful for rendering adjacent triangles, however, if the case of a zero valued edge variable is treated differently for left and right edges (e.g., inside for right-edges and outside for left edges).

In the example, there are two edges defining right boundaries since it is a right oriented triangle. The triangle under consideration is a right oriented triangle and thus has two right edges. Since y is above the vertex joining the two right edges, the upper right edge is used.

The traversal algorithm begins the scan at some pixel and determines the value of the edge variables based upon the functions above. For the example, we will assume that the single-pixel traversal algorithm chooses the pixels (5, 2), the top vertex, as the start point. Therefore, the initial values of the edge variable are as follows:

$$e_0 = 0$$

$$e_1 = 0$$

$$e_2 = 36$$

$e_0$ is the right edge variable of interest for the initial pixel since the vertical position of the scan is above (14, 11)—the point where the two right edges meet. Variable $e_1$ is the only left edge variable and thus will be used to test every pixel. For the initial pixel, the left edge variable is not negative, so this pixel is not rendered.

In a single-pixel method, the traversal algorithm moves to another pixel, computes the values of the edge variables at this pixel, and perform the test to check if it is within the triangle boundaries. Movement from pixel to pixel during traversal is referred to as "stepping." The next pixel in the traversal is usually adjacent to the previous pixel, which simplifies evaluation of the edge variables. Determining the value of the edge variables at an adjacent pixel is a matter of adding a constant to the current values since the edge functions are linear. These constants are referred to as increment values or step values. The increment values for a step in the horizontal direction is always ±1, since the edge variable is defined as the horizontal distance between the pixel and the edge. The increment values for a step in the vertical direction will be ±m, when the edge function is in the form used above: $f(y) = my + c$. For the example triangle the increment values for each edge variable will be as follows:

| | | | |
|---|---|---|---|
| $\Delta e_{0\,left} = -1$ | $\Delta e_{0\,right} = 1$ | $\Delta e_{0\,up} = -1$ | $\Delta e_{0\,down} = 1$ |
| $\Delta e_{1\,left} = -1$ | $\Delta e_{1\,right} = 1$ | $\Delta e_{1\,up} = 0.231$ | $\Delta e_{1\,down} = -0.231$ |
| $\Delta e_{2\,left} = -1$ | $\Delta e_{2\,right} = 1$ | $\Delta e_{2\,up} = 3$ | $\Delta e_{2\,down} = -3$ |

In our example, we will assume the traversal algorithm steps (5, 3), the pixel below the current one. The new value of the edge variables will be as follows:

$$e_0 = e_0 + \Delta e_{0\,down} = 1$$

$$e_1 = e_1 + \Delta e_{1\,down} = -0.231$$

$$e_2 = e_2 + \Delta e_{2\,down} = 66$$

For pixel (5, 3), the left edge variable, $e_1$, is negative and the right variable, $e_0$ is non-negative. This means that the pixel is within the triangle bounds and will be rendered.

The traversal continues stepping from pixel to pixel, adding the appropriate increment values to the edge variables and testing the values of the left and right boundaries. This must be done for at least every pixel in the triangle. The total number of pixels traversed will depend upon the efficiency of the particular traversal algorithm being used.

Pixel-Span Method

The pixel-span method is similar to the single-pixel method, except that it allows the rendering test to be performed for multiple pixels based upon one evaluation of the edge variables. The method operates on pixels that are grouped into horizontal spans w bits wide (the example uses w=4). This technique interprets edge variables and increment values in the same way as the single-pixel method except the traversal algorithm will step horizontally in units of w, so the left/right increment values will be $\pm w$ instead of $\pm 1$.

When determining which pixels should be rendered, the mask generation unit 720 is used to indicate which pixels within a span to render. This information is represented by a mask of w bits; a one indicating the pixel should be rendered, a zero indicating it should not. The mask represents pixels (w, y) through (x+w−1,y). As discussed above, computation of the rendering mask is the result of the logical AND of masks generated for the left and right edge that applies to the current pixel.

Mask generation uses the binary representation of the edge variables as shown by Tables 1 and 2, above. In the tables, the sub-span position bits are the n least significant bits of the binary representation of the integer part of the edge variable, where $w=2^n$. The span position bits are the remaining bits excluding the sign bit. The sign is the most significant bit as defined in 2's complement format.

A traversal algorithm for the pixel-span method behaves in basically the same way as it would when using the single-pixel method. Two differences are that the pixel-span traversal algorithm will move horizontally in steps of w pixels, and the starting x position must be a multiple of w. With this in mind, consider again the example triangle shown in FIG. 9. Now the traversal algorithm will start at pixel (4, 2) (as indicated by an X in FIG. 9), since 4 is a multiple of w. The value of the edge variables will be the following:

$$e_0 = 1$$

$$e_1 = 1$$

$$e_2 = 37$$

Using Tables 1 and 2, we determine the mask for the left edge variable, $e_0$, to be 0011 and the right edge, $e_1$, to be 1100. The logical AND of these two masks is 0000 and therefore no pixels are to be rendered.

The traversal algorithm now steps down one span to pixel (4, 3). The new values for the edge variables of interest will be $e_0=2$ and $e_1=0.769$. This produces the respective left and right masks 1110 and 0111. The logical AND of these is 0110 so pixels (4,3) and (7,3) are not rendered since the values for these pixels in the mask is zero. However, pixels (5, 3) and (6,3) will be rendered since the values in the mask for these pixels equal one.

The pixel-span method has advantages over the single-pixel technique because there are fewer arithmetic operations per pixel rendered. The single-pixel technique described above requires three addition operations per pixel as the traversal algorithm steps. (It is possible to reduce this for some pixels if the traversal algorithm is such that it renders all pixels that use $e_0$ as the right edge before rendering any pixels that use $e_2$ as the right edge (the "bottom half" of the triangle). When rendering the bottom half, $e_0$, would no longer need to be updated, thus requiring only two operations per pixel. However, the increase in efficiency is not always worth this added complexity in an actual implementation of graphics hardware.) Using the pixel-span method, the edge variables are only updated once for every w pixels. This is accomplished with the aid of mask generation unit 720 which produces the mask values representing a pixel span. This function unit can be easily implemented using simple combinatorial logic as should be readily apparent to those skilled in the art.

The present invention can also integrate a window clipping routine with the polygon rasterization techniques described above. FIG. 12 illustrates an example of a window 1210 and triangle 1220 in which a window bound mask generation routine is applied. In the example shown, part of the triangle 1220 falls outside of window 1210, and only those potions of the triangle that fall within the window need to be rendered. In order to determine whether pixel span 1230 is within window 1210 a separate mask is generated for the edges of the window 1210. In the example shown in FIG. 12 a mask is generated for edges 1240 and 1250. These masks are then ANDed with the rendering mask generated for triangle 1220. The resulting window bound mask would represent which pixels within span 1230 would be rendered.

Finally, hardware can be generalized for more complex polygons. The complex polygons can be broken into simpler polygons or triangles. Multiple sets of edges can be used to rasterize the polygons. Specifically, additional masks would be generated for each edge of the polygon and the resulting masks would be ANDed together. Alternatively, the complex polygons can be broken into multiple triangles and passed through the polygon rasterization hardware.

While the invention has been particularly shown and described with reference to preferred embodiments thereof, it will be understood by those skilled in the art that various changes in form and details may be made therein without departing from the spirit and scope of the invention.

What is claimed is:

1. A computer-based method for determining which pixels to render as part of a triangle in order to rasterize polygons, the method comprising the steps of:
   (1) generating, for the three edges of the triangle, three edge variables each of which indicates whether a first pixel falls inside or outside a triangle;
   (2) generating three masks based upon the values of said edge variables, said masks are representative of a span of pixels, wherein said first pixel is the initial pixel in said span of pixels; and
   (3) logically ANDing said three masks to produce a render-mask which represents which pixels within said span of pixels should be rendered.

2. The method of claim 1, further comprising the steps of traversing the triangle to a next pixel located after said span of pixels; adding an incremental value to each of said edge variables; and repeating steps (2) and (3).

3. The method of claim 1, wherein said render-mask, which consists of a string of W bits, has a render-mask bit for the pixel at position (x, y), and render-mask bits for the next W−1 pixels in the horizontal row.

4. The method of claim 1, wherein each of said edge variables contains a sign bit, span position bits, and sub-span position bits.

5. The method of claim 1, wherein the number of pixels in said span of pixels is a power of two.

6. The method of claim 1, further comprising the step of rendering the pixels within the triangle using said render-mask.

7. A computer-based system for determining which pixels to render as part of a triangle in order to rasterize polygons, the system comprising:
   (a) an integer datapath having a plurality of registers and at least one adder/subtracter unit, wherein said integer datapath is configured to generate three edge variables each of which indicates whether a first pixel falls inside or outside a triangle;
   (b) a pixel mask generation unit, adapted to accept from said integer datapath said three edge variables, said pixel mask generation unit further adapted to generate a render mask that indicates which pixels within a span of pixels are to be rendered as part of the triangle; and
   (c) a rendering unit which takes said render mask from said pixel mask generation unit and issues commands to a memory system for each pixel to be rendered or not.

8. The system of claim 7, wherein said pixel mask generation unit comprises mask means for generating three masks based upon the values of said edge variables, said masks are representative of a span of pixels; and means for logically ANDing said three masks to produce a render-mask which represents which pixels within said span of pixels should be rendered.

9. The system of claim 8, wherein said mask means comprises a lookup table which provides different masks depending upon the value of said edge variable.

10. The system of claim 7, wherein said span of pixels correspond to blocks of data accessed by said memory system.

11. The system of claim 7, wherein said edge variables represent the signed, horizontal distance between a given pixel and one of the edges of the triangle.

12. A computer-based method for determining which pixels to render as part of a polygon in order to rasterize the polygon, the method comprising the steps of:
   (1) generating, for the plurality of edges of the polygon, a plurality of edge variables each of which indicates whether a first pixel falls inside or outside the polygon;
   (2) generating a plurality of masks based upon the values of said edge variables, said masks are representative of a span of pixels, wherein said first pixel is the initial pixel in said span of pixels; and
   (3) logically ANDing said plurality of masks to produce a render-mask which represents which pixels within said span of pixels should be rendered.

13. The method of claim 12, further comprising the steps of traversing the polygon to a next pixel located after said span of pixels; adding an incremental value to each of said edge variables; and repeating steps (2) and (3).

14. The method of claim 12, wherein said render-mask, which consists of a string of W bits, has a render-mask bit for the pixel at position (x,y), and render-mask bits for the next W−1 pixels in the horizontal row.

15. The method of claim 12, wherein each of said edge variables contains a sign bit, span position bits, and sub-span position bits.

16. A computer-based system for determining which pixels to render as part of a polygon in order to rasterize the polygon, the system comprising:
   (a) an integer datapath having a plurality of registers and at least one adder/subtracter unit, wherein said integer datapath is configured to generate a plurality of edge variables each of which indicates whether a first pixel falls inside or outside the polygon;
   (b) a pixel mask generation unit, adapted to accept from said integer datapath said plurality of edge variables, said pixel mask generation unit further adapted to generate a render mask that indicates which pixels within a span of pixels are to be rendered as part of the polygon; and
   (c) a rendering unit which takes said render mask from said pixel mask generation unit and issues commands to a memory system for each pixel to be rendered or not.

17. The system of claim 16, wherein said pixel mask generation unit comprises mask means for generating a plurality of masks based upon the values of said edge variables, said masks are representative of a span of pixels; and means for logically ANDing said plurality of masks to produce a render-mask which represents which pixels within said span of pixels should be rendered.

18. The system of claim 17, wherein said mask means comprises a lookup table which provides different masks depending upon the value of said edge variable.

19. The system of claim 16, wherein said span of pixels corresponds to blocks of data accessed by said memory system.

20. The system of claim 16, wherein said edge variables represent the signed, horizontal distance between a given pixel and one of the edges of the polygon.

* * * * *